United States Patent
Yurchenco et al.

(10) Patent No.: US 8,133,426 B1
(45) Date of Patent: Mar. 13, 2012

(54) INJECTION MOLDING WITH CONTROLLED PART FLEXING

(75) Inventors: James R. Yurchenco, Palo Alto, CA (US); Wally Szeremeta, Mission Viejo, CA (US); Michael O. Cronkite, Thousand Oaks, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 98 days.

(21) Appl. No.: 12/790,721

(22) Filed: May 28, 2010

(51) Int. Cl.
*B29C 45/44* (2006.01)

(52) U.S. Cl. .. 264/318; 264/334; 425/556; 425/DIG. 58

(58) Field of Classification Search ............... 264/318, 264/334; 425/556, DIG. 58
See application file for complete search history.

(56) References Cited

U.S. PATENT DOCUMENTS

| | | | |
|---|---|---|---|
| 4,113,829 A | 9/1978 | Bowker et al. | |
| 4,201,360 A | 5/1980 | Schwartzburg et al. | |
| 4,777,004 A * | 10/1988 | Galer | 264/318 |
| 4,873,043 A | 10/1989 | Meyers | |
| 5,281,385 A * | 1/1994 | Julian | 264/318 |
| 5,639,416 A | 6/1997 | Pennisi et al. | |
| 5,968,564 A | 10/1999 | Welsh et al. | |
| 7,378,046 B2 * | 5/2008 | Canty et al. | 264/318 |

FOREIGN PATENT DOCUMENTS

JP 63-253811 * 10/1988

* cited by examiner

*Primary Examiner* — Jill Heitbrink

(57) ABSTRACT

An injection molding process and apparatus are described in which a workpiece is formed using an injection molding tool. The mold composed of a cavity formed by a core and a plurality of cavity sides, wherein the workpiece has a plurality of undercut features formed in notches within the core. The injection molding method includes flexing sections of the workpiece apart from each other to at least partially separate the workpiece from the core.

18 Claims, 14 Drawing Sheets

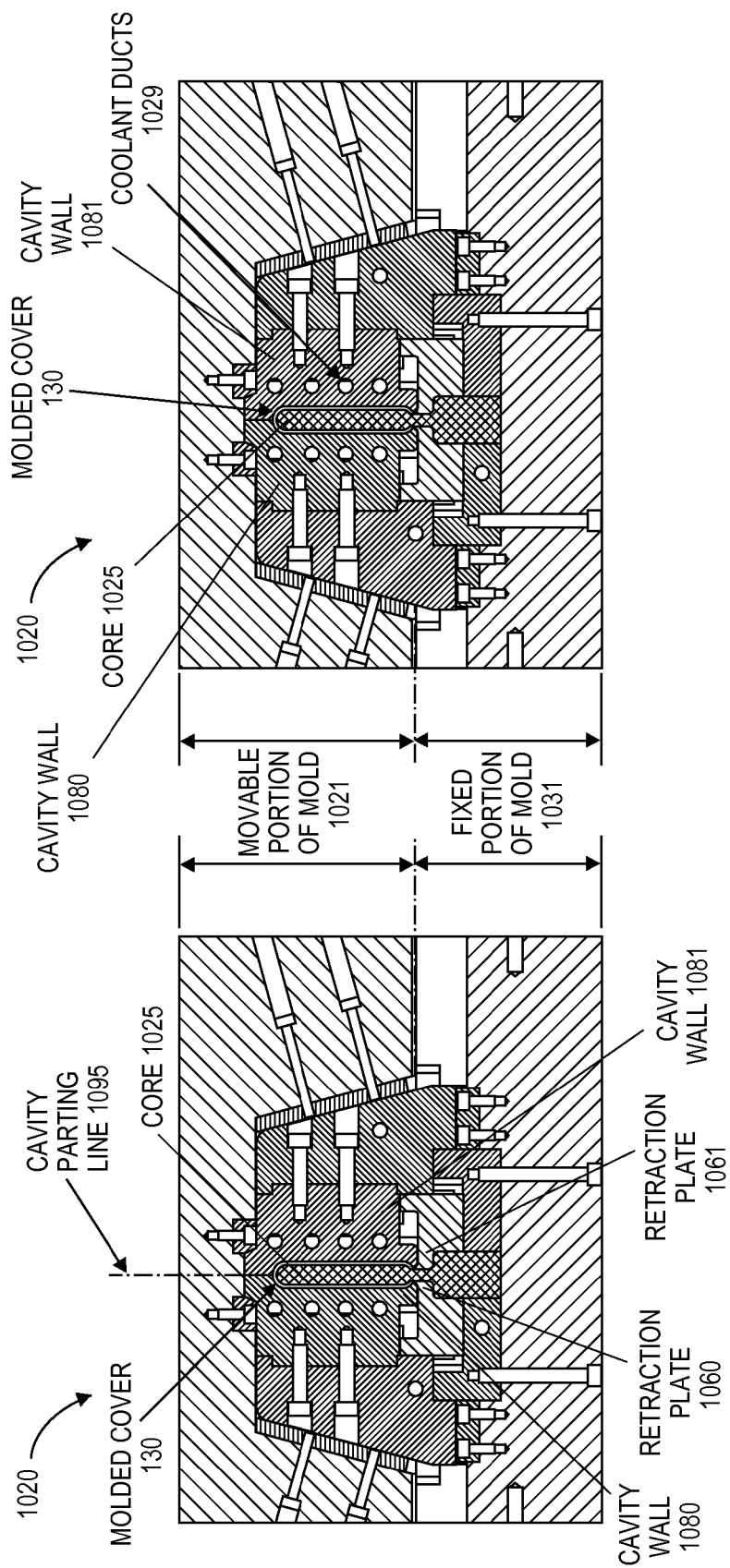

INJECTION MOLDING WITH CONTROLLED PART FLEXING

TECHNICAL FIELD

Embodiments described herein relate to the field of injection molding, more particularly, to flexing of a controlled part during injection molding.

BACKGROUND

Injection molding processes are widely used to produce low cost and relatively complex parts. One of the benefits of injection molding is its ability to produce high volumes of the same parts. However, an injection molding process may require that the design of a workpiece follow very specific guidelines in order to achieve a producible and defect free component. Therefore, the injection molding process by itself produces certain constrains on the workpiece construction such as, for example, uniform wall thickness, round corners, draft angles, etc.

BRIEF DESCRIPTION OF THE DRAWINGS

Embodiments are illustrated by way of example, and not limitation, in the figures of the accompanying drawings in which:

FIGS. 4 through 14 are cross section views illustrating various embodiments of the injection molding tool at different points in the injection molding method embodiments of FIG. 3.

DETAILED DESCRIPTION

Embodiments of an injection molding process and apparatus are described herein with reference to figures. However, particular embodiments may be practiced without one or more of these specific details, or in combination with other known methods, materials, and apparatuses. In the following description, numerous specific details are set forth, such as specific materials, dimensions, processes parameters, etc. to provide a thorough understanding. In other instances, well-known manufacturing processes and equipment have not been described in particular detail to avoid unnecessarily obscuring the claimed subject matter. Reference throughout this specification to "an embodiment" or "some embodiments" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

Figure 1:
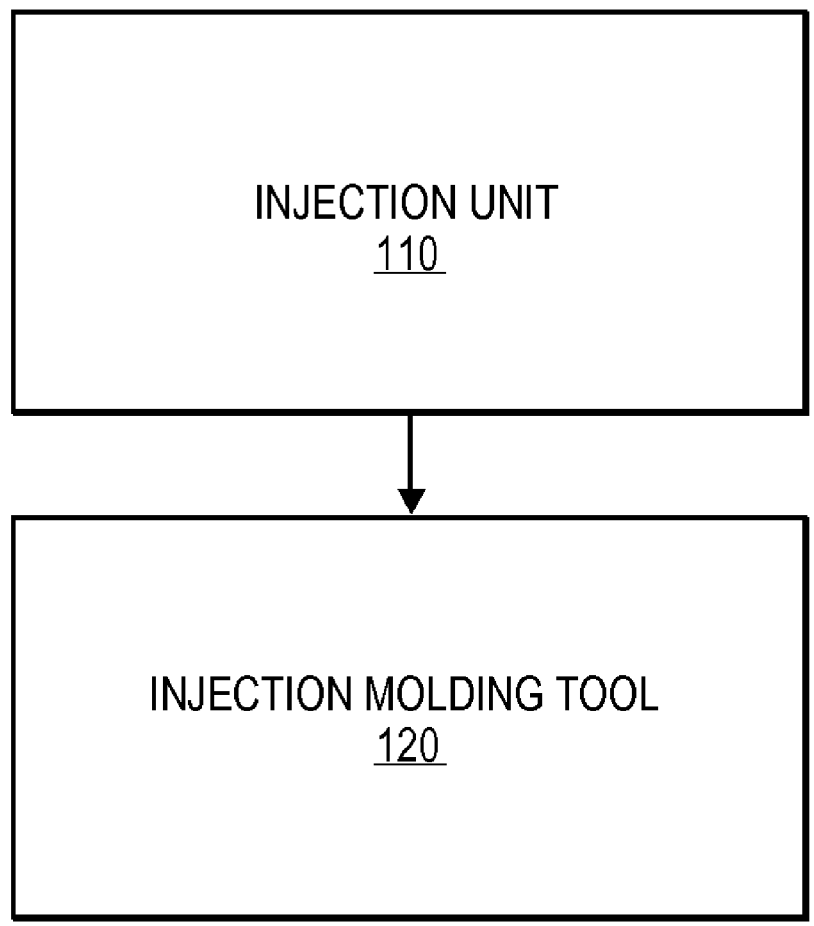
FIG. 1 is a block diagram illustration of an injection molding machine having an injection molding tool in accordance with embodiments of the present invention.

FIG. 1 is a block diagram illustration of an injection molding machine having an injection molding tool in accordance with embodiments of the present invention. Injection molding machine 100 includes an injection unit 110 operatively coupled with an injection molding tool 120. In an injection molding process, injection unit 110 delivers raw material (e.g., a polymer) to injection molding tool 120 that contains a mold. The raw material is melted and then injected into the mold by the injection molding machine 100. In some embodiments, the injection molding tool 120 fits into a standardized receptor of an injection molding machine 100. In this manner, multiple parts of various sizes and shapes can be molded using one molding machine 100 simply by exchanging different injection molding tools 120.

In one embodiment, the injection unit 110 may be responsible for both heating and injecting the raw material into the mold. The injection unit 110 may include a container in which the raw material is stored from which material is fed into a barrel. The barrel contains a mechanism (e.g., ram injector, reciprocating screw, etc.) for heating and injecting the material into the mold. The raw material is injected through mold channels within the injection molding tool 120 into the mold contained therein. The molten raw material that is inside the mold then starts to cool as it makes contact with the surface of the mold components (i.e., the core and cavity walls). As the raw material cools, it solidifies into the shape of the desired workpiece. It should be noted that the injection unit 110 may have other components and some of the above noted components may be considered as residing in other units of the injection molding machine 100. Moreover, the injection molding machine 100 may have various different configurations such as a horizontal configuration and a vertical configuration which are well known in the art.

Figure 2A:
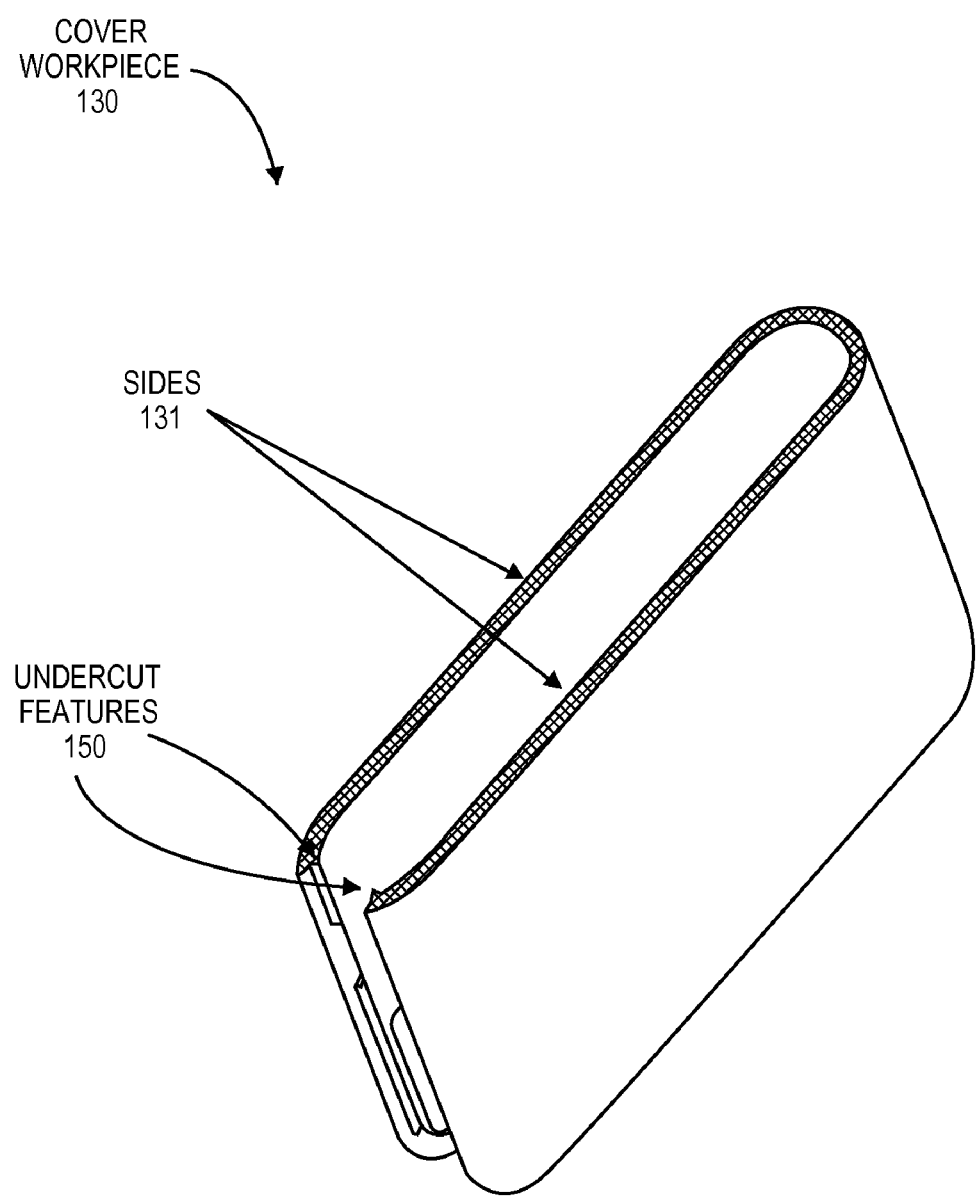
FIG. 2A illustrates a perspective view of one embodiment of a workpiece showing a cross section of the side edge that may be formed in accordance with embodiments of the present invention.

In one embodiment of the present invention, the workpiece 130 being molded is a cover (e.g., of an external disk drive enclosure), as illustrated in FIG. 2A. The cover 130 is molded (e.g., using a polymer as a raw material) to have sides 131 that are thin enough to be preferably non-deformably flexed after formation. In this embodiment, the sides 131 of the molded cover 130 are curved inwards, forming pockets, and have undercut features 150 at their ends. Separation of such a molded cover 130 from a core in conventional injection molding tool may cause damage to the undercut features 150. Embodiments of the injection molding tool 120 of the present invention may be utilized to provide for flexing of sides 131 of the cover 130 apart from each other after injection of the raw material into the mold in order to at least partially separate the cover from the core before extraction of the either the core from the cover and/or the cover from the core.

Figure 2B:
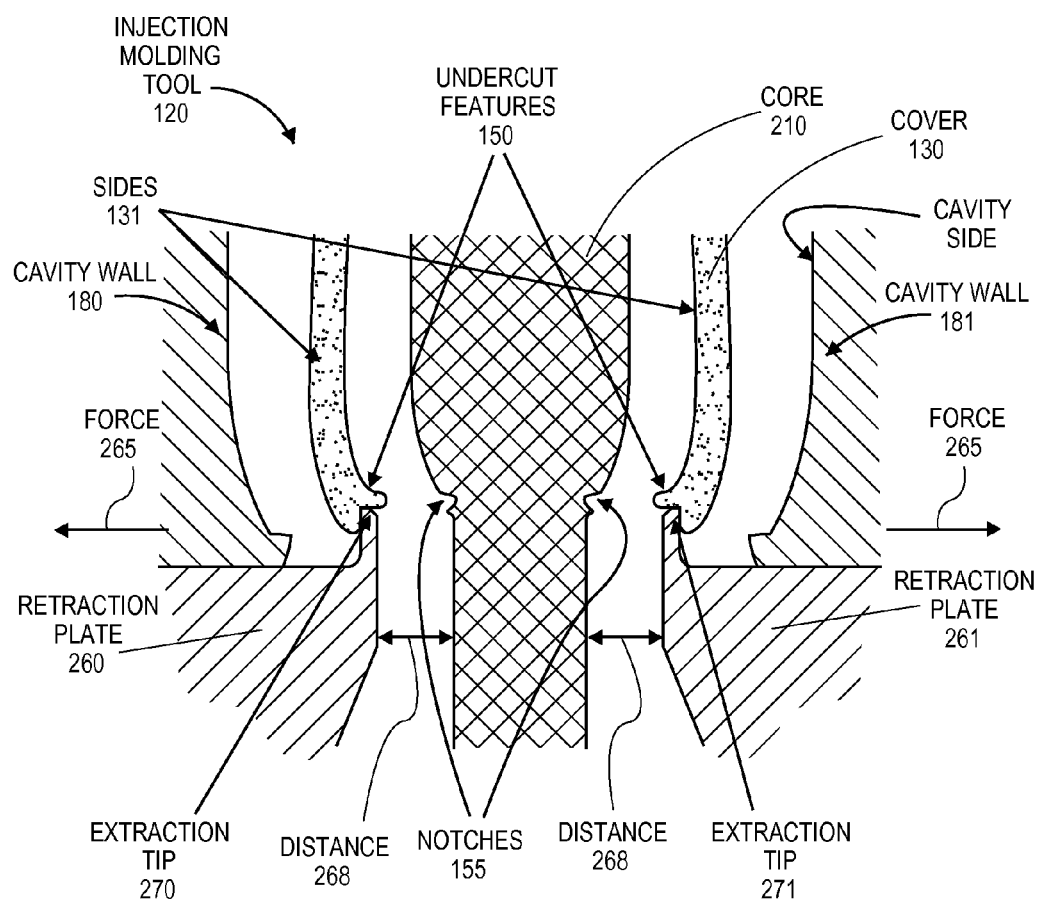
FIG. 2B is a cross section illustrating undercut features of cover workpiece relative to corresponding notches in a core that form the undercut features in accordance with one embodiment of the present invention.

FIG. 2B is a cross section illustrating the undercut features 150 of cover 130 relative to corresponding notches 155 in the core 210 that form the undercut features 150. Also shown in the FIG. 2B are retraction plates 260 and 261 having extraction tips 270 and 217, respectively, contacting the ends of sides 131 below the undercut features 150, that are used to separate the undercut features 150 from the core. The operation of the retraction plates 260 and 261 are discussed in further detail below in relation to the following figures. Although embodiments of injection molding process may be described in regards to a cover as being the workpiece, it should be appreciated that embodiments of the present invention may also be used for the injection molding of other types of workpieces having an undercut feature.

Figure 3:
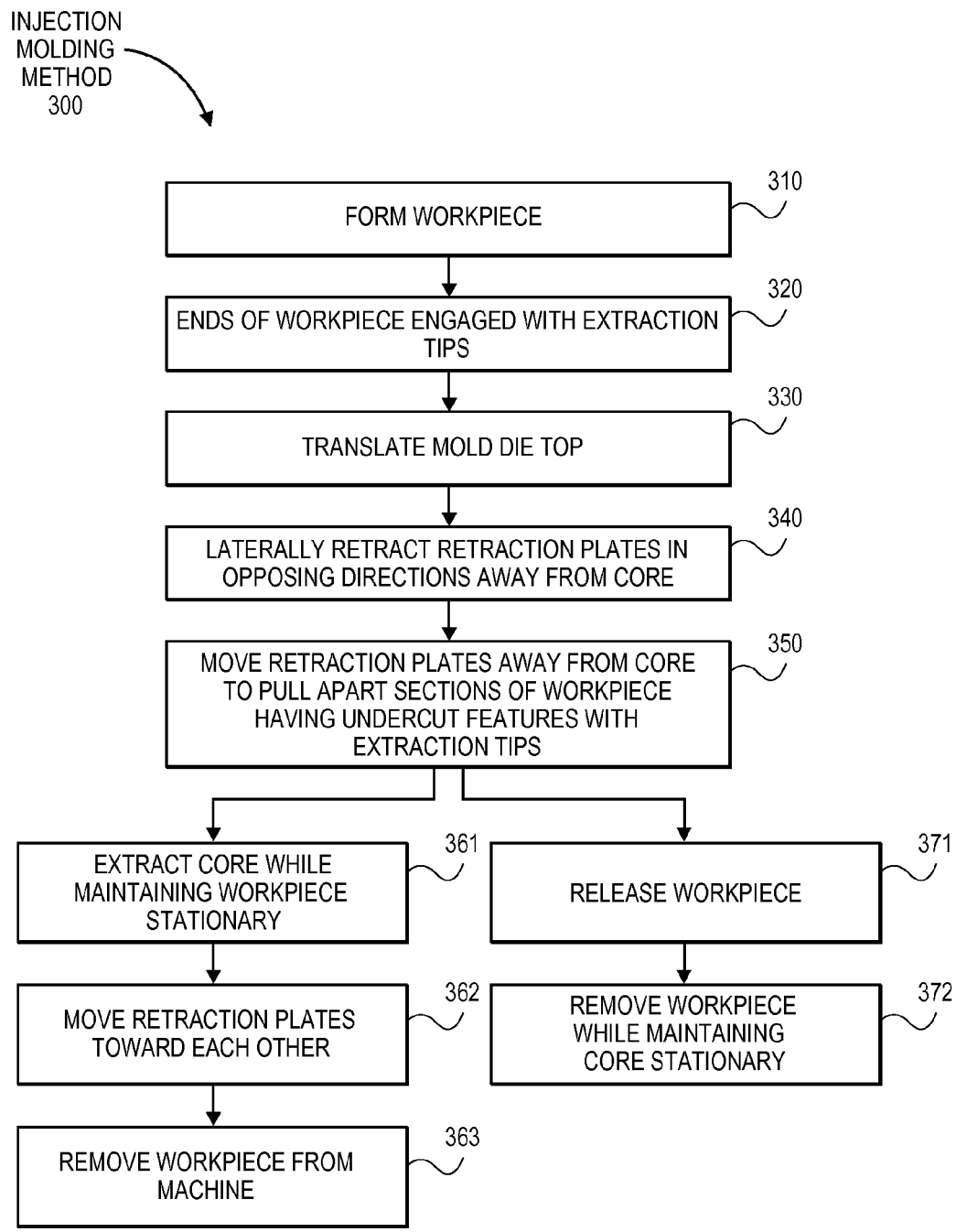
FIG. 3 is flow chart illustrating embodiments of an injection molding method.

FIG. 3 illustrates embodiments of an injection molding method. FIGS. 4 through 14 are cross section views illustrating various embodiments of the injection molding tool 120 at different blocks in the injection molding method 300. The following discussion is made in reference to both the embodiments of the injection molding method of FIG. 3 and the embodiments of the injection molding tool 120 of FIGS. 4-14.

Figure 4:
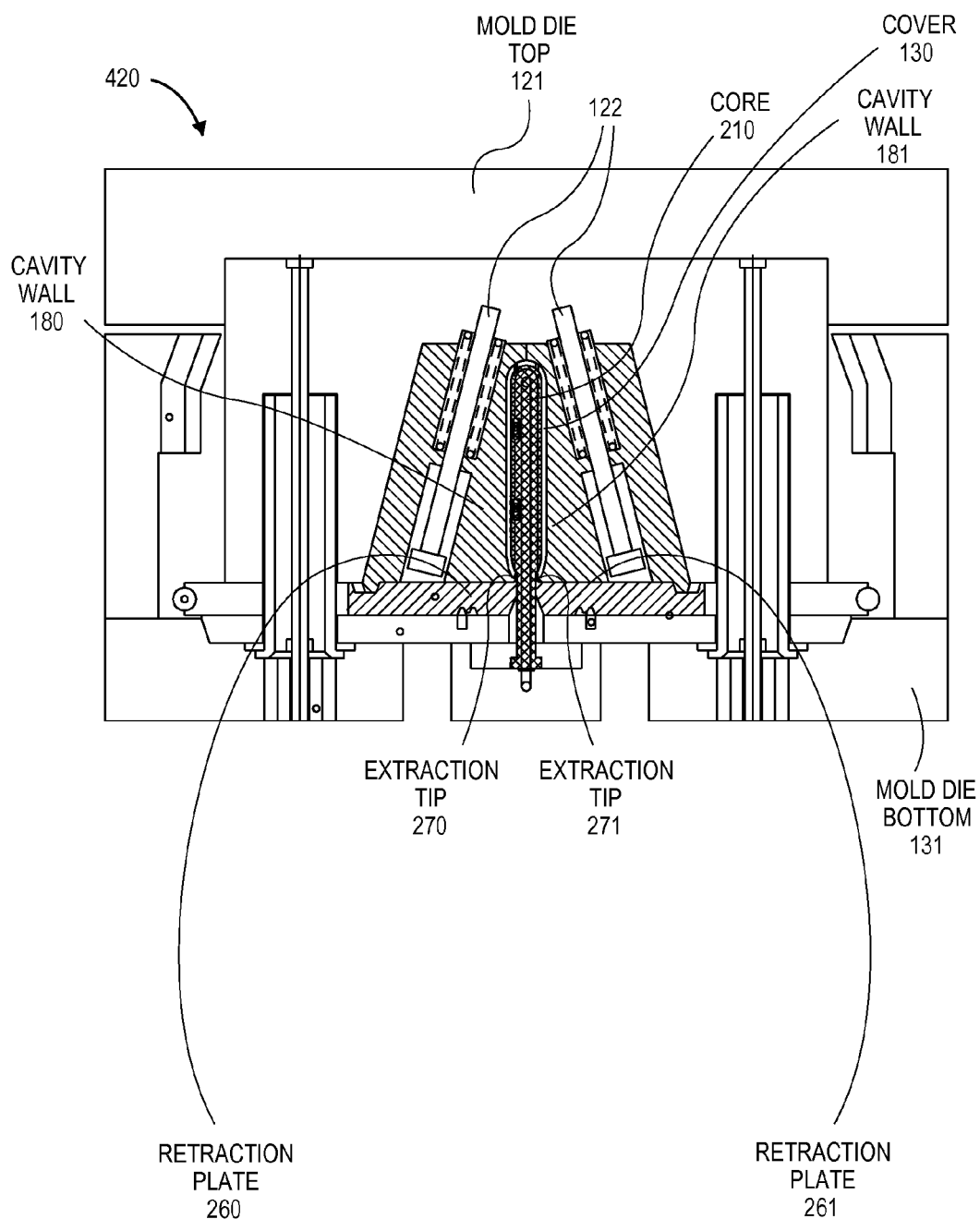

FIG. 4 is a cross sectional view illustrating one embodiment of the injection molding tool 420 at a closed stage in the injection molding method. Injection molding tool 420 includes a mold die top 121 and a mold die bottom 131 and actuators (not shown) which operate to bring together and to separate the mold die top 121 and the mold die bottom 131. In an embodiment as shown, mold die top 121 includes opening mechanisms 122 connecting to the cavity walls 180, 181. In various embodiments, opening mechanisms 122 may include spring mechanisms, pistons, actuators, or other extendable (as shown) or rotatable mechanisms to separate that cavity walls 180, 181 from each other when opening the mold. In the embodiment illustrated, opening mechanisms 122 may be biased to lengthen and separate the cavity walls 180, 181 when the mold die top 121 is retracted from the mold die bottom 131. As discussed above in relation to FIG. 2B, the cavity walls 180 and 181 together with the core 210 and the extraction tips 270 and 271 create a mold cavity, when the injection molding tool 420 is the closed position as shown in FIG. 4, that forms cover 130.

The injection molding method 300 begins with the formation of the cover 130, block 310. The operation of the injection unit 110 to form the cover 130, as described above, is well known to those of ordinary skill in the art; accordingly, a further description is not provided herein. After formation of the cover, the extraction tips 270 and 271 of the retraction plates 260 and 261, respectively, are engaged with the ends of the cover as shown in FIG. 4 (see FIG. 3 block 320). In such an embodiment, the extraction tips 270 and 271 act in conjunction with the core 210 in forming the undercut features 150 of the molded cover 130. In the injection molding tool 420 configuration of FIG. 4, the injection molding tool 420 is shown in the closed position after which time the raw material has been injected into cavity.

Figure 5:
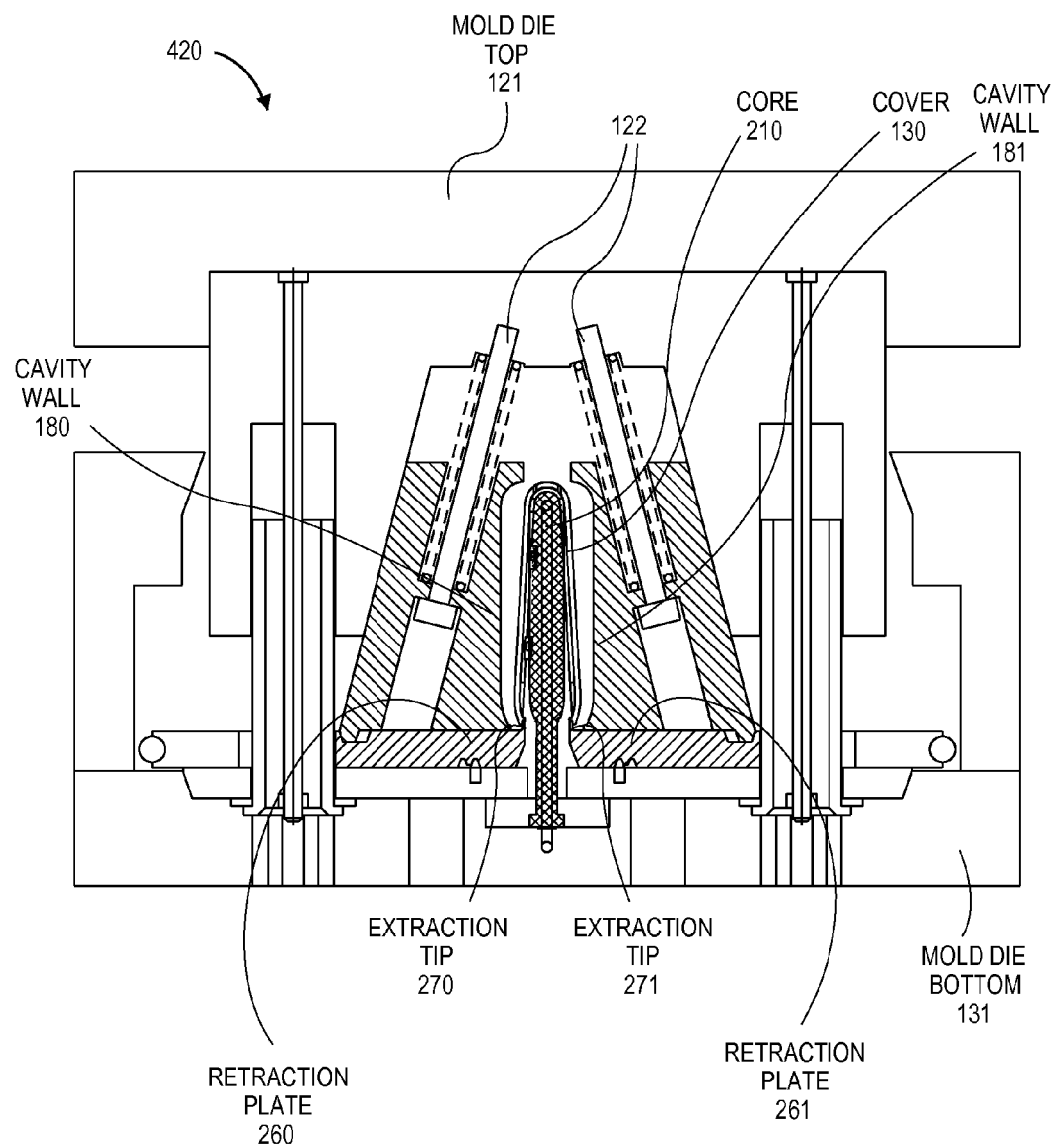

After the cavity is filled with raw material to a desired pressure and cooled, the mold die top 121 is translated away from the mold die bottom 131, block 330. In some embodiments, the mold die top 121 is initially vertically translated. Whereupon opening mechanisms 122, which are arranged in an angled orientation, extend causing the cavity walls 180, 181 to move primarily vertically but also to move horizontally. This horizontal aspect of the movement of cavity walls 180, 181 additionally causes horizontal translation of retraction plates 260 and 261, respectively, to which they are biased at this stage (see FIG. 5). In this manner, the retraction plates 260 and 261 are laterally retracted in opposing directions away from the core 210, block 340. The retraction plates 260 and 261 are in contact with the ends of sides 131 of cover 130 at the extraction tips 270 and 271, respectively. As such, the retraction of the retraction plates 260, 261 generates a force 265 on the ends of sides 131 of cover 130 that pulls apart the ends of the sides 131 of the cover 130, block 350. This results in the flexing of the ends of sides 131 apart from each other to at least partially separate the cover 130 from the core 210, as illustrated in FIG. 5. Alternatively, the extraction tips 270, 271 may be in contact with other portions of the cover 130 (e.g., the side edges of cover 130. The retraction plates 260 and 261 slide on riser plates 290 and 291, shown in FIG. 6, until they are locked into position with locking mechanism 295 as illustrated by FIG. 6.

In reference to FIG. 2B, in one embodiment, the retraction plates 260 and 261 are each spread apart from the core 210 a distance 268 of 9.8 millimeters (mm) and the force 265 is approximately 1.5 Newton (N). Alternatively, distance 268 and force 265 may have other values. For example, the retraction plates may be retracted in a distance 268 in a range of 2.5 mm to 50 mm and the extraction force 265 is in a range of 0.5 N to 20 N.

Figure 6:
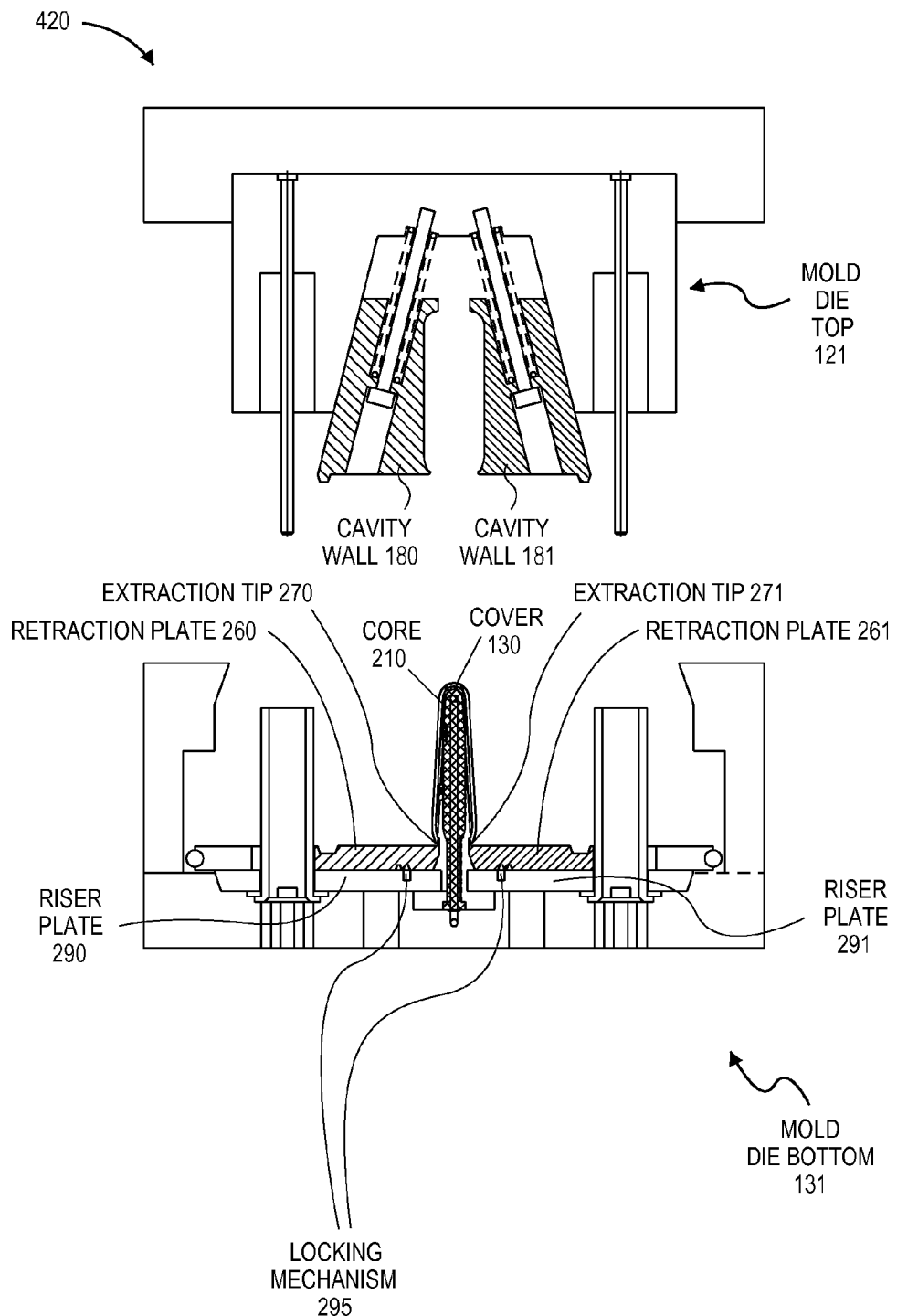
Figure 7:
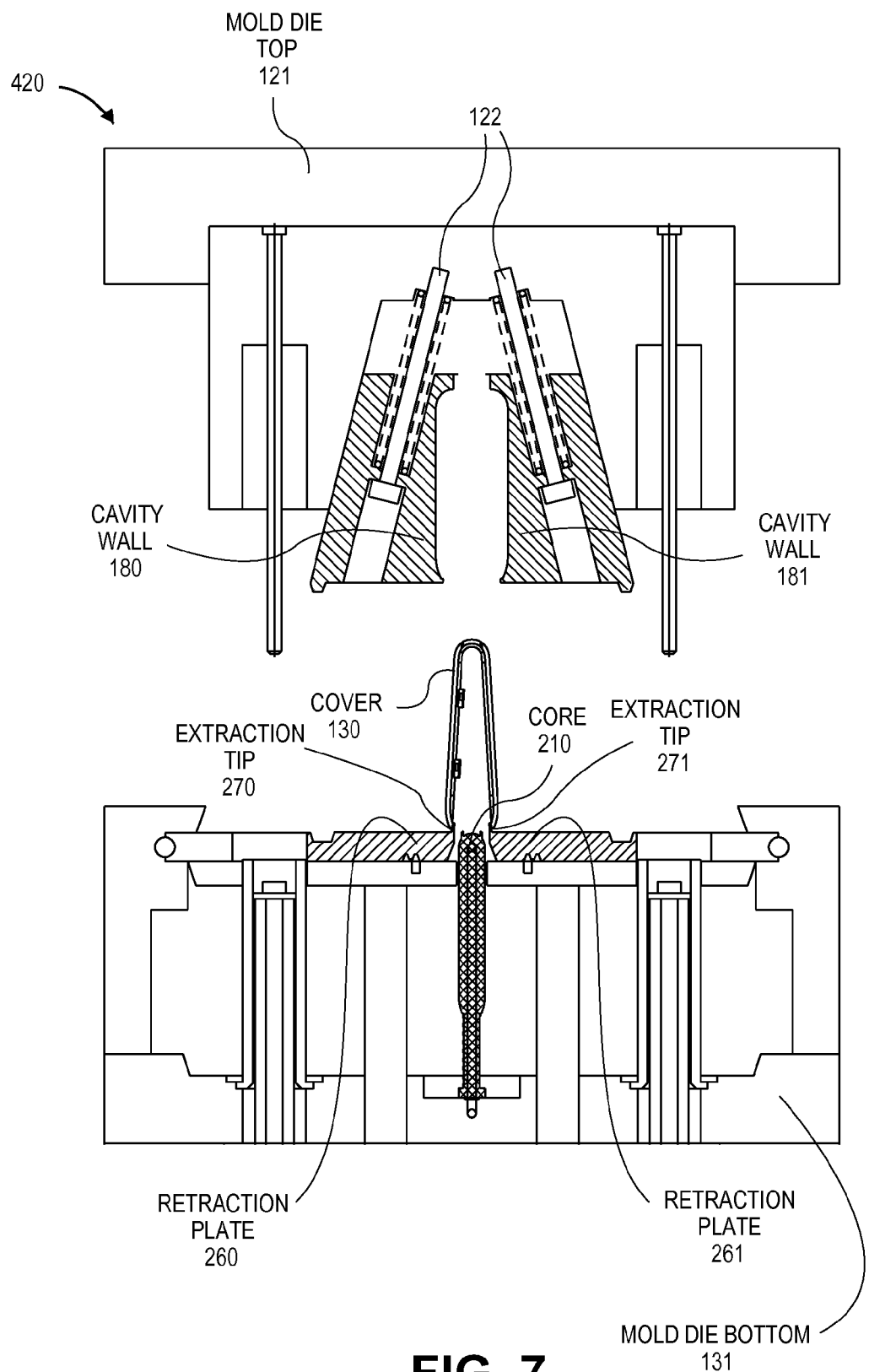

In some embodiments, the mold die top 121, at the stage illustrated in FIG. 6, is fully separated from the mold die bottom 131 and the retraction plates 260 and 261 slide on riser plates 290 and 291 until they are locked into position. In some embodiments, the injection molding method then continues with block 361 in which the core 210 is extracted while the cover 130 is maintained relatively stationary. In some embodiments, as illustrated in FIG. 7, the core 210 is extracted by lowering the core into the mold die bottom 131 using a lowering mechanism. Various options for such a lowering mechanism are known in the art; accordingly, further details are not provided.

Figure 8:
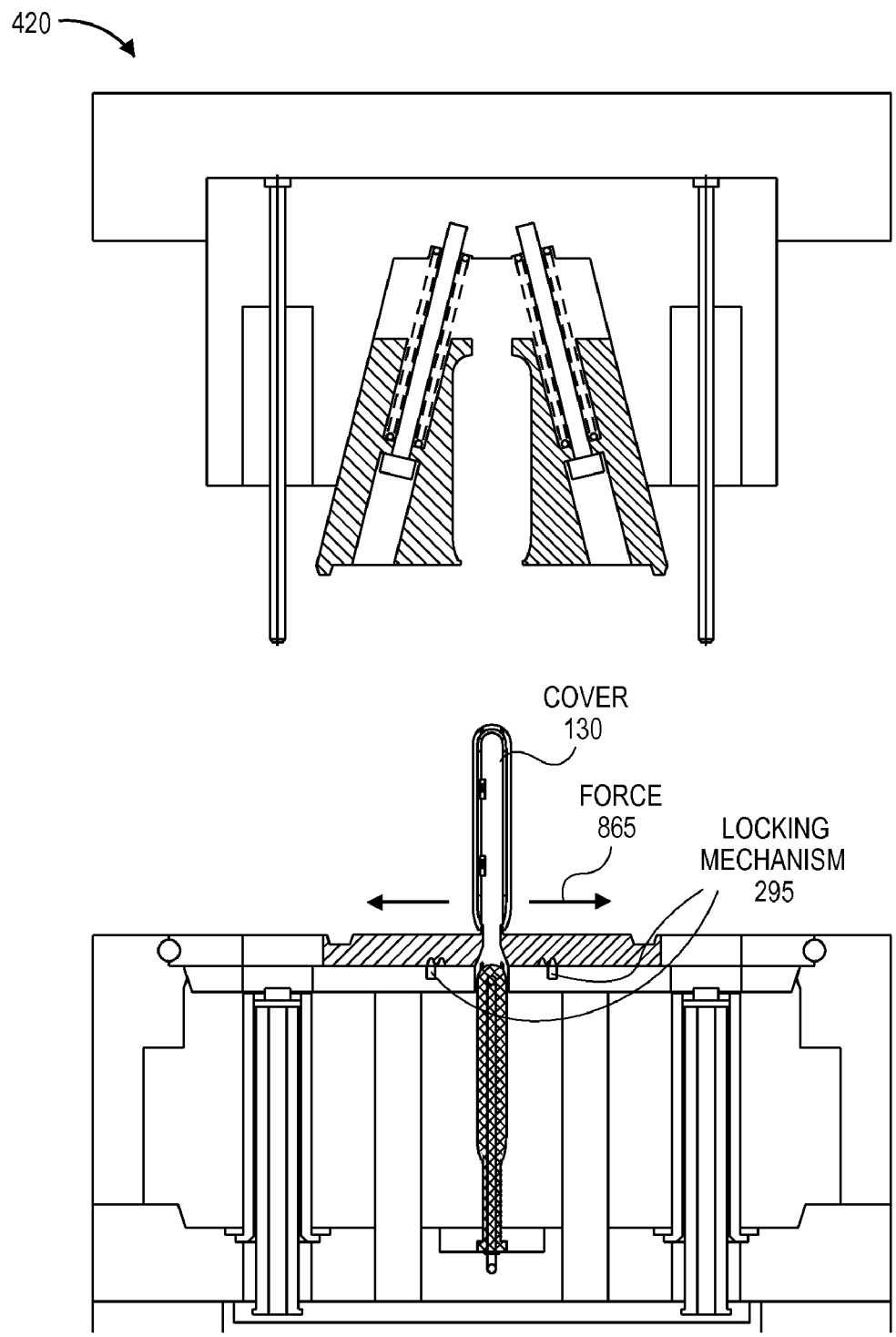
Figure 9:
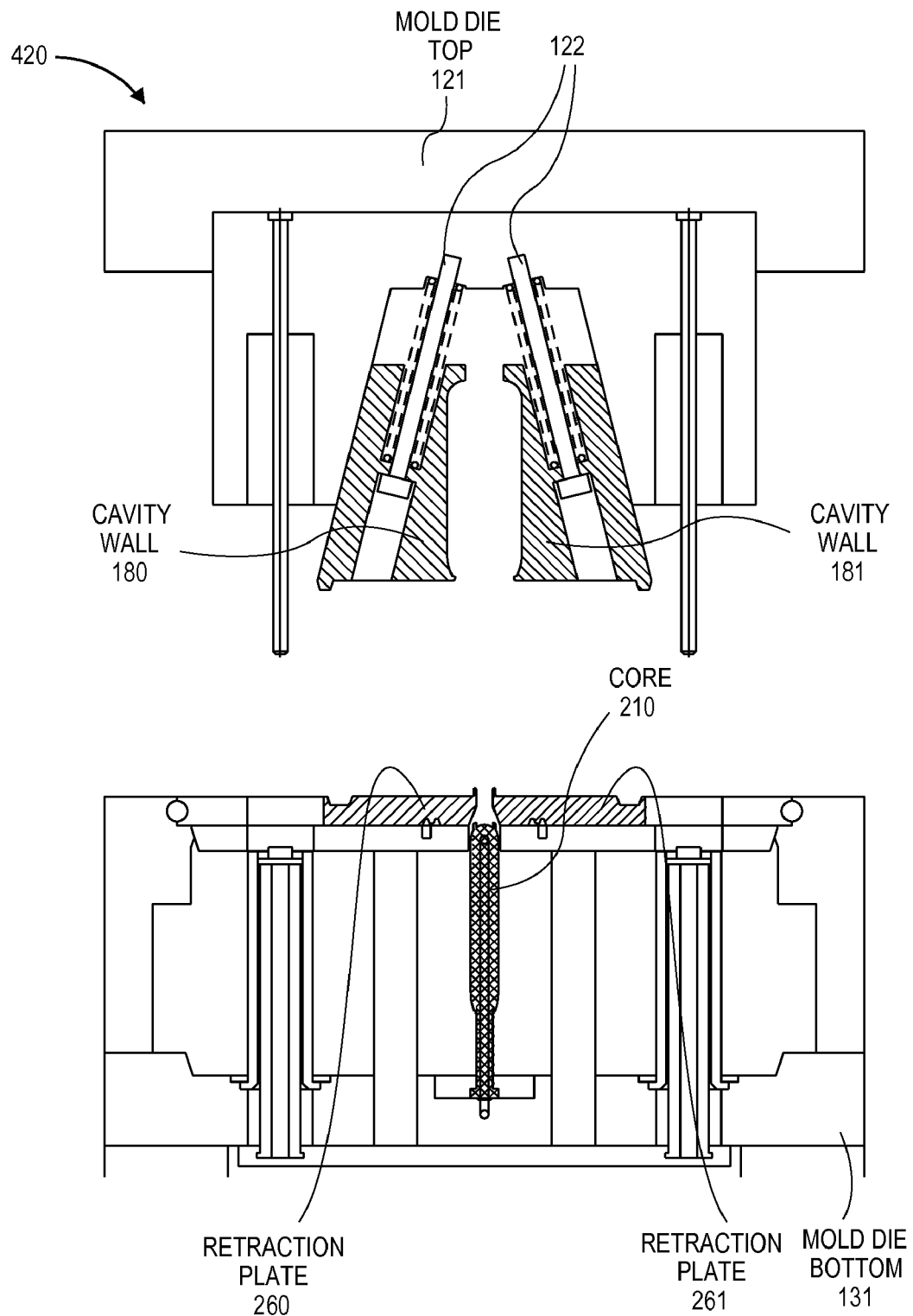

Next, in block 362, the optional locking mechanism 295 is disengaged and the retraction plates 260 and 261 move towards each other, thereby at least partially de-flexing the end sections of the cover 130, as illustrated in FIG. 8. In some embodiments, the retraction plates 260 and 261 are not fully returned to their initial positions in order to provide enough of a force 865 to maintain a hold on the cover 130, such as to help prevent damage to the cover from falling out of the molding tool. In block 363, the cover 130 is removed from the injection molding tool 120, as illustrated by FIG. 9.

It should be noted that the injection molding tool 120 may be designed in other manners in order to accomplish the flexing of the ends of the sides 131 of the cover 130 apart from each other. For example, FIGS. 10-14 illustrate cross sections of one alternative embodiment of the injection molding tool 120 utilizing different mechanics in the operation of the tool to flex the ends of the sides 131 of the cover 130 apart from each other, and in which the cover is removed while the core is maintained stationary. FIG. 10 illustrates an alternative injection molding tool 1020 having a movable portion 1021 and a fixed portion 1031. In FIG. 10, the injection molding tool 1020 is in a closed position and ready to receive raw material. FIG. 11 illustrates the injection molding tool 1020 after the cover 130 has been formed in the same manner noted above in regards to block 310. In one embodiment, active cooling may be used to cool the raw material after it is injected in the cavity at the desired pressure. In one embodiment, cooling ducts (e.g., cooling duct 1029) throughout the cavity walls 1080 and 1081 may be used to assist in cooling cover 130.

Figure 12:
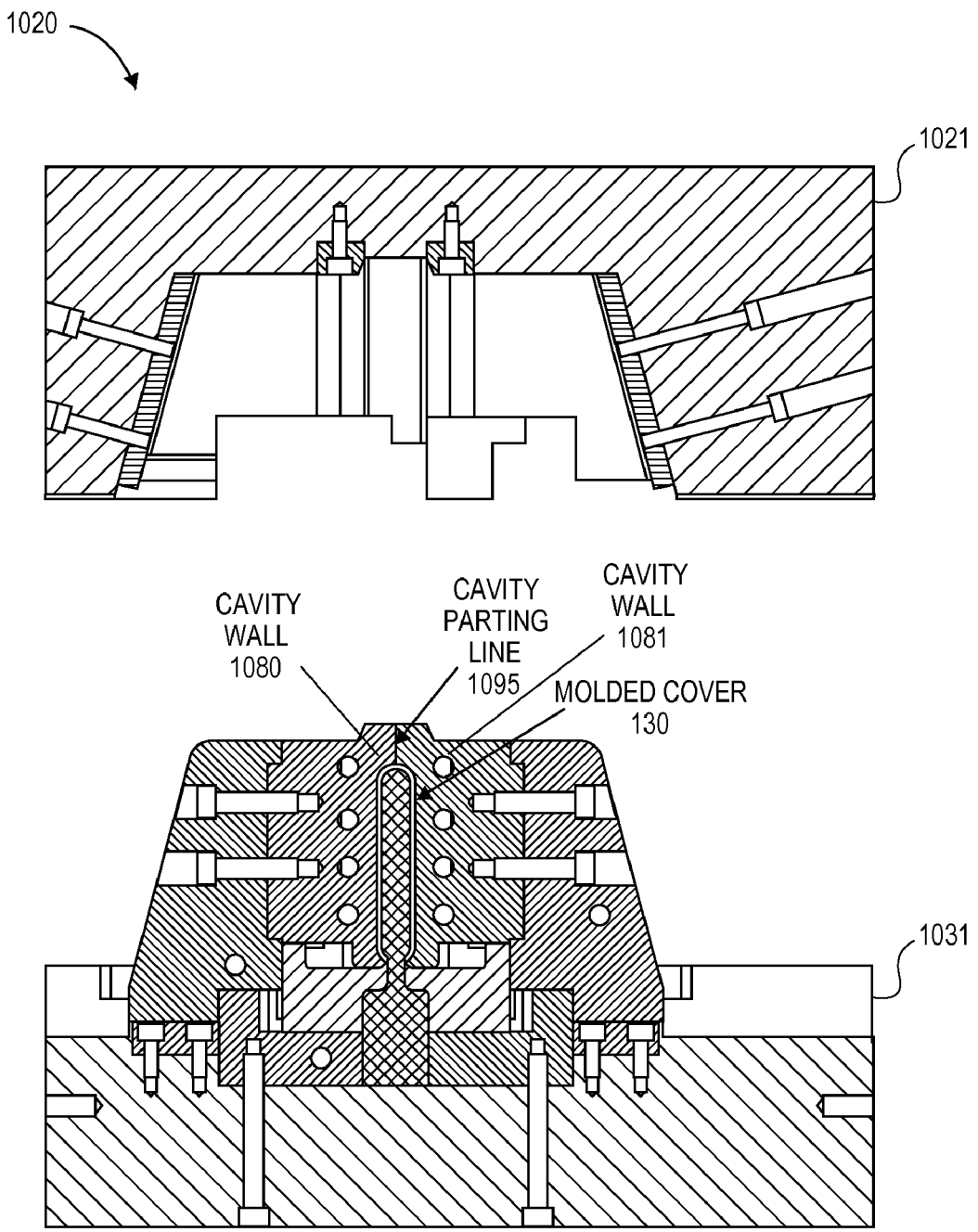
Figure 13:
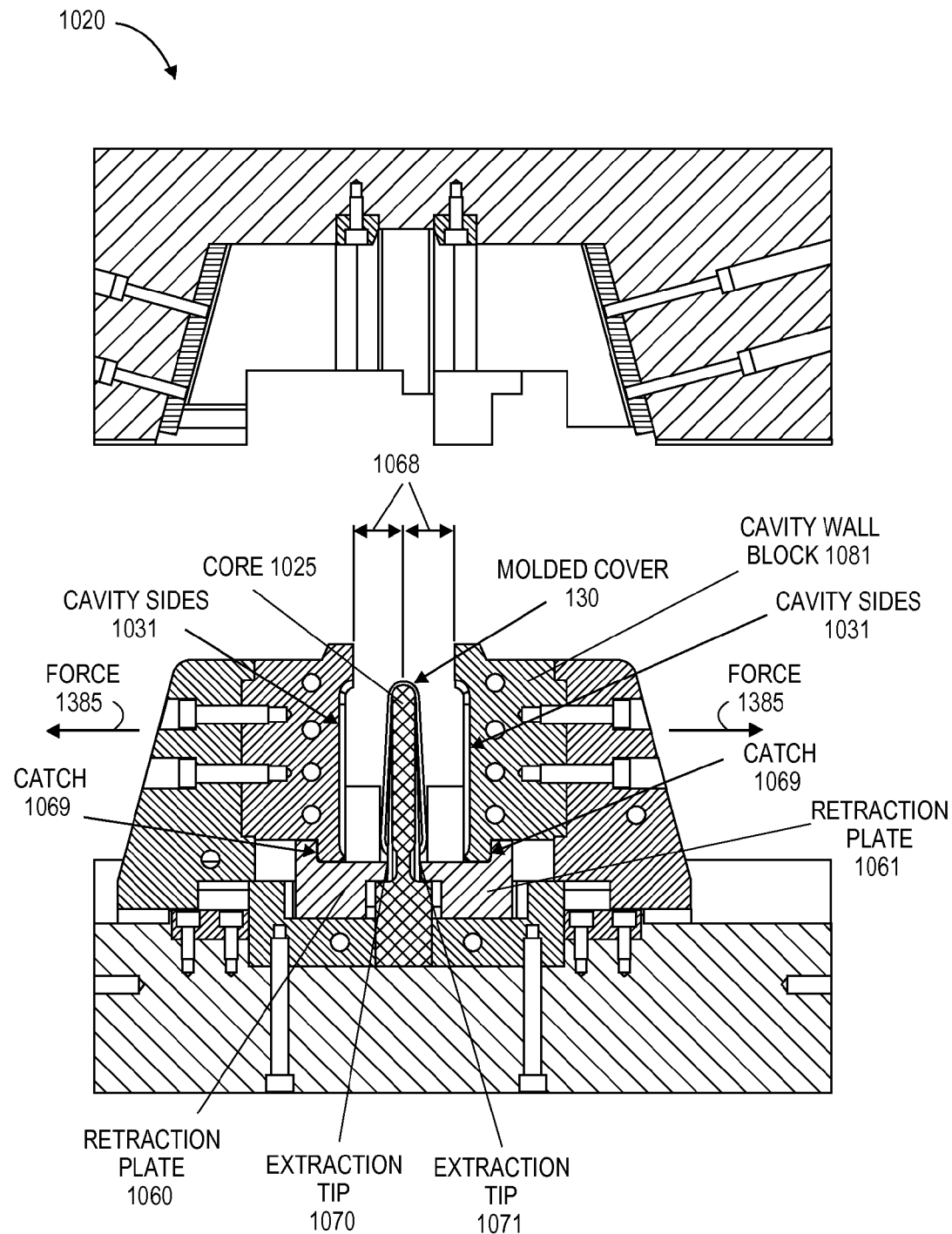

After the cavity is filled with raw material to a desired pressure and cooled, the movable portion 1021 of the tool is withdrawn upward as illustrated in FIG. 12. In some embodiments, actuators (not shown) are activated separating the cavity walls 1080 and 1081 along cavity parting line 1095. In some embodiments, actuators may be composed of four gas cylinders, two of each mounted in each of the cavity wall blocks 1080 and 1081. Alternatively, other types and configurations of actuators may be used. The actuators retract the cavity walls 1080 and 1081 a distance 1068 from the parting line 1095, which, in turn, generates a retraction force 1385 to horizontally translate the retraction plates 1060 and 1061, respectively, as illustrated in FIG. 13. As shown in FIGS. 12 and 13, in some embodiments, cavity walls 1080, 1081 may travel some portion of this distance before contacting a catch 1069 of the retraction plates 1060, 1061. In this manner, the retraction plates 1060 and 1061 are laterally retracted in opposing directions away from the core 1025 based on movement of the cavity walls 1080, 1081 but may only translate a smaller portion of the total translation distance 1068, block 340. The retraction plates 1060 and 1061 are in contact with the ends of sides 131 of cover 130 at the extraction tips 1070 and 1071, respectively. As such, the retraction of the retraction plates 1060 and 1061 generate a force 265 on the ends of sides 131 of cover 130 that pulls apart the side sections of the cover 130, block 350. This results in the flexing of the sides 131 of the cover 130 apart from each other to at least partially separate the cover 130 from the core 210, as illustrated in FIG. 13.

In various embodiments as shown and described where there is variable retraction distance of the retraction plates 1060, 1061 and the cavity walls 1080, 1081, the retraction plates 1060 and 1061 are each spread apart from the core 1025 a distance of approximately 4 mm, resulting in the cavity wall blocks 1080 and 1081 being separated from the cavity parting line 1095 a translation distance 1068 of approximately 24 mm. Alternatively, other distances may be used. Preferably, the translation distances of the retraction plates 1060, 1061 are sufficient to release the undercuts from the core 210 without putting undue strain on the cover 130.

Figure 14:
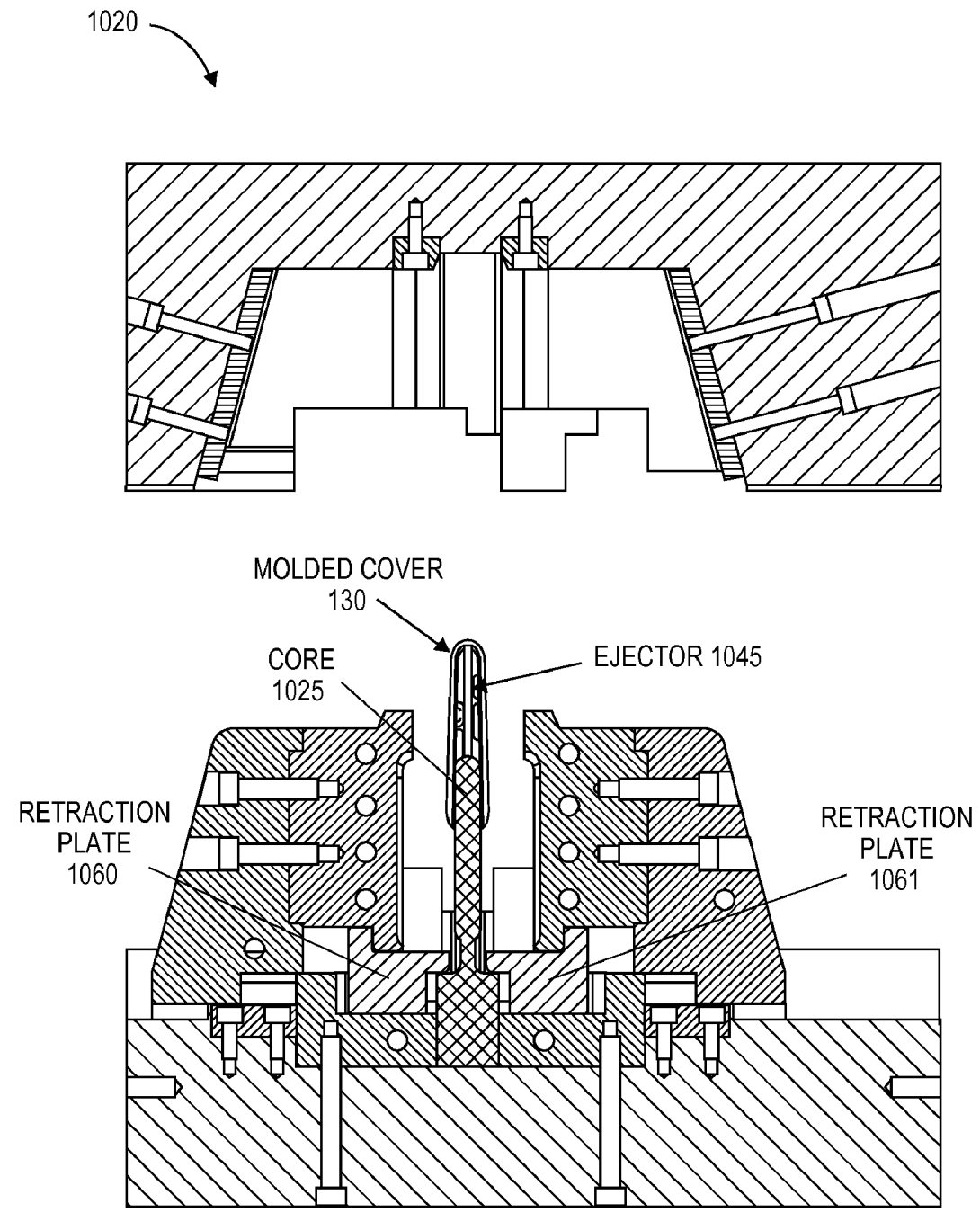

In some embodiments, an ejector 1045 disposed in the core 1025 is activated to at least partially release the molded cover 130 from the core 1025, block 371, as illustrated in FIG. 14. In one embodiment, the ejector 1045 may be composed of one or more spring load pins, pistons, actuators, and/or the like that, when activated, push the molded cover 130 outward over the core, exposing the cover enough to clear the notches of the core 1025. Alternatively, other types of ejectors known in the art may be used. The molded cover can then be removed from the injection molding tool 1020 while the core 1025 is maintained stationary, block 372 of FIG. 3. The injection molding tool 1020 may then be closed, making it ready to receive another injection of raw material to form another cover. In another embodiment, the translation distances of the cavity walls 1080, 1081 are sufficient to allow an operator to reach between the cavity walls to extract the molded cover 130. It is understood that other automated or manually operated mechanical devices could also be used to extract the molded cover 130.

Although these embodiments have been described in language specific to structural features and methodological acts, it is to be understood that the invention defined in the appended claims is not necessarily limited to the specific features or acts described in particular embodiments. For example, although blocks of embodiments of inventive methods for molding may have been described in a specific order, one of skill in the art will understand that some of the blocks described may occur simultaneously, in overlapping time frames, and/or in a different order from that described herein and fall within embodiments of the present invention. Similarly, some directional language was used for ease of description of embodiments as illustrated in the figures. One of skill in the art, however, will note that mold die top 121 and mold die bottom 131, for example, could, in some embodiments, move horizontally rather than vertically. Portions of the molding injection molding tool 120 could also move rotationally or diagonally in accordance with different embodiments of the present invention.

What is claimed is:

1. An injection molding method, comprising:
    forming, using an injection molding tool, a workpiece within a mold, the mold comprising a mold cavity formed by a core, a plurality of cavity sides, and first and second extraction tips, wherein the workpiece has a plurality of undercut features formed in notches within the core, wherein after forming, the first and second ends of the workpiece sections are engaged with the first and second extraction tips, respectively, wherein the first and second extraction tips are coupled to respective first and second retraction plates disposed on opposite sides of the core; and
    flexing sections of the workpiece apart from each other to at least partially separate the workpiece from the core by applying an extraction force on the first and second ends of the workpiece by moving the first and second retraction plates away from the core to pull apart the sections of the workpiece having the undercut features, wherein moving the first and second retraction plates away from the core comprises laterally retracting first and second cavity walls coupled to the first and second retraction plates, respectively, in opposing directions away from the core.

2. The injection molding method of claim 1, further comprising extracting the core from an interior of workpiece while maintaining the workpiece stationary.

3. The injection molding method of claim 1, further comprising:
    extracting the core from an interior of workpiece while maintaining the workpiece stationary;
    moving the first and second retraction plates together; and
    removing the workpiece from the injection molding tool.

4. The injection molding method of claim 1, wherein the retraction plates are retracted a distance in a range of 2.5 mm to 50 mm.

5. The injection molding method of claim 1, wherein the extraction force is in a range of 0.5 Newton to 20 Newton.

6. The injection molding method of claim 1, further comprising:
    releasing the workpiece from the core by pushing the plurality of undercut features of workpiece apart from the notches of the core and the moving the workpiece vertically away from the core; and
    removing the workpiece from the injection molding tool while maintaining the core stationary.

7. The injection molding method of claim 6, wherein each of the plurality of cavity sides are slid approximately 24 mm.

8. The injection molding method of claim 6, wherein the workpiece is released from the core using an ejector.

9. The injection molding method of claim 8, wherein releasing comprises activating the ejector.

10. The injection molding method of claim 9, wherein the ejector is disposed within the core.

11. The injection molding method of claim 1, wherein the first and second cavity walls are each laterally retracted a distance of approximately 4 mm.

12. The injection molding method of claim 1, wherein the workpiece is a cover of a disk drive housing.

13. The injection molding tool of claim 1, wherein the core comprises first and second notches configured to form respective first and second undercut features in the workpiece.

14. An injection molding machine, comprising:
    an injection unit; and
    an injection molding tool coupled to the injection unit, the injection molding tool comprising:
        a mold comprising a cavity formed by a core and a plurality of cavity sides;
        a first retraction plate;
        a second retraction plate disposed on an opposite side of the core to the first retraction plate, wherein each of the first and second retraction plates has an extraction tip configured to engage a respective first and second end section of a molded workpiece;
        a first cavity wall, having a first of the plurality of cavity sides, coupled to the first retraction plate; and a second cavity wall, having a second of the plurality of cavity sides, coupled to the second retraction plate, wherein each of the first and second cavity walls are configured to move laterally in opposing directions away from the core and wherein the first and second cavity walls are configured to generate a reaction force on the first and second retraction plates, respectively, to spread apart the first and second end sections molded workpiece to be separated from the core.

15. An injection molding tool, comprising:

means for forming a workpiece within a mold, the mold comprising a mold cavity formed by a core and a plurality of cavity sides, wherein the workpiece has a plurality of undercut features formed in notches within the core;

a first and second extraction tips further forming the mold cavity and engaged with first and second ends of the workpiece sections after forming, wherein the first and second extraction tips are coupled to respective first and second retraction plates disposed on opposite sides of the core; and means for flexing sections of the workpiece apart from each other to separate the workpiece from the core, the means for flexing comprising the first and second extraction tips to engage with first and second ends of the workpiece having the plurality of undercut features, wherein the means for flexing further comprises means for applying an extraction force on the first and second ends of the workpiece by laterally retracting first and second cavity walls coupled to the first and second retraction plates, respectively, in opposing directions away from the core.

16. An injection molding tool, comprising:
a mold comprising a cavity formed by a core and a plurality of cavity sides; a first retraction plate;

a second retraction plate disposed on an opposite side of the core to the first retraction plate, wherein each of the first and second retraction plates has an extraction tip configured to engage a respective first and second end section of a molded workpiece;

a first cavity wall, having a first of the plurality of cavity sides, coupled to the first retraction plate; and a second cavity wall, having a second of the plurality of cavity sides, coupled to the second retraction plate, wherein each of the first and second cavity walls are configured to move laterally in opposing directions away from the core and wherein the first and second cavity walls are configured to generate a reaction force on the first and second retraction plates, respectively, to spread apart the first and second end sections molded workpiece to be separated from the core.

17. The injection molding tool of claim 16, further comprising an ejector disposed within the core to at least partially separate the workpiece from the core.

18. The injection molding tool of claim 17, wherein the ejector is a spring loaded mechanism comprising one or more pins.

* * * * *